INVENTORS
ROBERT A. DISCHERT &
NORMAN P. KELLAWAY
BY W. H. Sprague
Attorney

VIDEO SIGNAL PROCESSING SYSTEM

Filed April 3, 1964 5 Sheets-Sheet 2

INVENTORS
ROBERT A. DISCHERT &
NORMAN P. KELLAWAY
BY W. H. Sprangle
Attorney

VIDEO SIGNAL PROCESSING SYSTEM

Filed April 3, 1964 5 Sheets-Sheet 3

INVENTORS
ROBERT A. DISCHERT &
NORMAN P. KELLAWAY
BY W. H. Spoungle
Attorney

INVENTORS
ROBERT A. DISCHERT &
NORMAN P. KELLAWAY
BY W. H. Sprouagle
Attorney

INVENTORS
ROBERT A. DISCHERT &
NORMAN P. KELLAWAY
BY W. H. Spouagle
Attorney

United States Patent Office 3,368,033
Patented Feb. 6, 1968

3,368,033

VIDEO SIGNAL PROCESSING SYSTEM

Robert A. Dischert, Burlington Township, Burlington County, and Norman P. Kellaway, Haddon Heights, N.J., assignors to Radio Corporation of America, a corporation of Delaware Filed Apr. 3, 1964, Ser. No. 357,029
17 Claims. (Cl. 178—7.1)

ABSTRACT OF THE DISCLOSURE

Between a signal source and a video signal output the system includes in succession a controlled gain video signal amplifier, a clamp, a gamma amplifier and clipper, and a video output amplifier. At a point between the controlled gain and output amplifiers black level setting apparatus is connected to operate in conjunction with the clamp to set the black representative portions of the video signals either automatically to a fixed reference potential or manually to a potential represented by a black pulse of selected amplitude and polarity inserted for occurrence during retrace intervals of the video signals. A feedback loop from the video signal output to the controlled gain amplifier controls this amplifier either automatically in response to white representative signal peaks or manually in response to white pulses of selected amplitude inserted for occurrence during retrace intervals of the video signals.

This invention relates to video signal processing apparatus and particularly to apparatus for effecting the necessary preparation of a video signal derived from an image pickup device for transmission to image reproducing apparatus.

The image representative video signals derived from a pickup device require certain processing in order to prepare them for transmission to one or more signal receiving and image reproducing devices. Such processing includes suitable amplification of the generated video signals, the modification of the signals to effect what is known as aperture correction, a suitable gain control of the signals, proper clamping or otherwise setting the signals to enable the proper reproduction thereof by cathode ray tube apparatus, and the like. Some of the functions to be performed in such signal processing, for example, the gain control and black level setting desirably should be automatically as well as manually performed. In prior art video signal processing systems, the complete automatic control of signal gain and black level has not been entirely satisfactory, or even feasible, because of undesired interaction between gain control and black level control apparatus.

It, therefore, is an object of the present invention to provide a signal processing system by which to facilitate the preparation of video signals for transmission and in which there is little or no interaction between the various controls so that the functions performed by these controls may be achieved automatically as well as manually with maximum facility.

In the embodiment of the apparatus disclosed herein the various signal processing functions are arranged in the chain of apparatus in such a way that certain of the major functions such as gamma correction, gain control and black level setting are completely independent of one another. This is achieved by providing apparatus for such functions as gamma correction and black level setting within the feedback loop by which gain control is effected. The gain controlled amplifier for the video signal precedes the gamma correction and black level setting apparatus and the control signal for the amplifier is derived at a point in the chain of apparatus which follows the gamma correction and black level setting apparatus. By such means, the black level setting apparatus affects only the black portion of the video signal and the gain control apparatus maintains a selected amplitude relationship between the white portion of the video signal and a selected black level. The gamma correction of the video signal is effected at a point in the video signal processing chain of apparatus following the gain controlled amplifier and preceding the point at which the gain control signal is derived. Thus, the amplitude of the signal is not altered by the functioning of the gamma control apparatus.

Both the black level setting and the gain control of the video signal may be accomplished either manually or automatically. For automatic control of the black level of the video signal the signal is clamped to a fixed reference voltage such as ground for example. For manual black level setting a so-called black pulse is introduced into the video signal during horizontal (i.e. line) blanking intervals at a point in the chain of apparatus preceding the black level setting apparatus and the video signal is clamped to the black pulse. The magnitude and polarity of this black pulse may be altered to produce the desired black level setting. The gain control of the video signal also may be effected either automatically or manually. The gain of the signal is controlled automatically in response to peak white video signals or manually by means of so-called white pulses introduced into the video signal during horizontal blanking intervals.

The disclosed apparatus also includes apparatus for automatically controlling the peak-to-peak magnitude of the video signal. This control is effected by detecting the peak-to-peak amplitude of the video signal as derived from the pickup device to develop a control signal. The control signal is used to vary the sensitivity of the pickup apparatus either by regulating the total light derived from the subject and admitted to the pickup device or by controlling the response by the pickup device to light admitted thereto from the subject.

For a detailed disclosure of apparatus embodying the present invention reference now will be made to the following description which is taken in conjunction with the accompanying drawings.

FIGURES 1 and 2, taken together, comprise a block diagram of the apparatus embodying the present invention.

Figure 1:
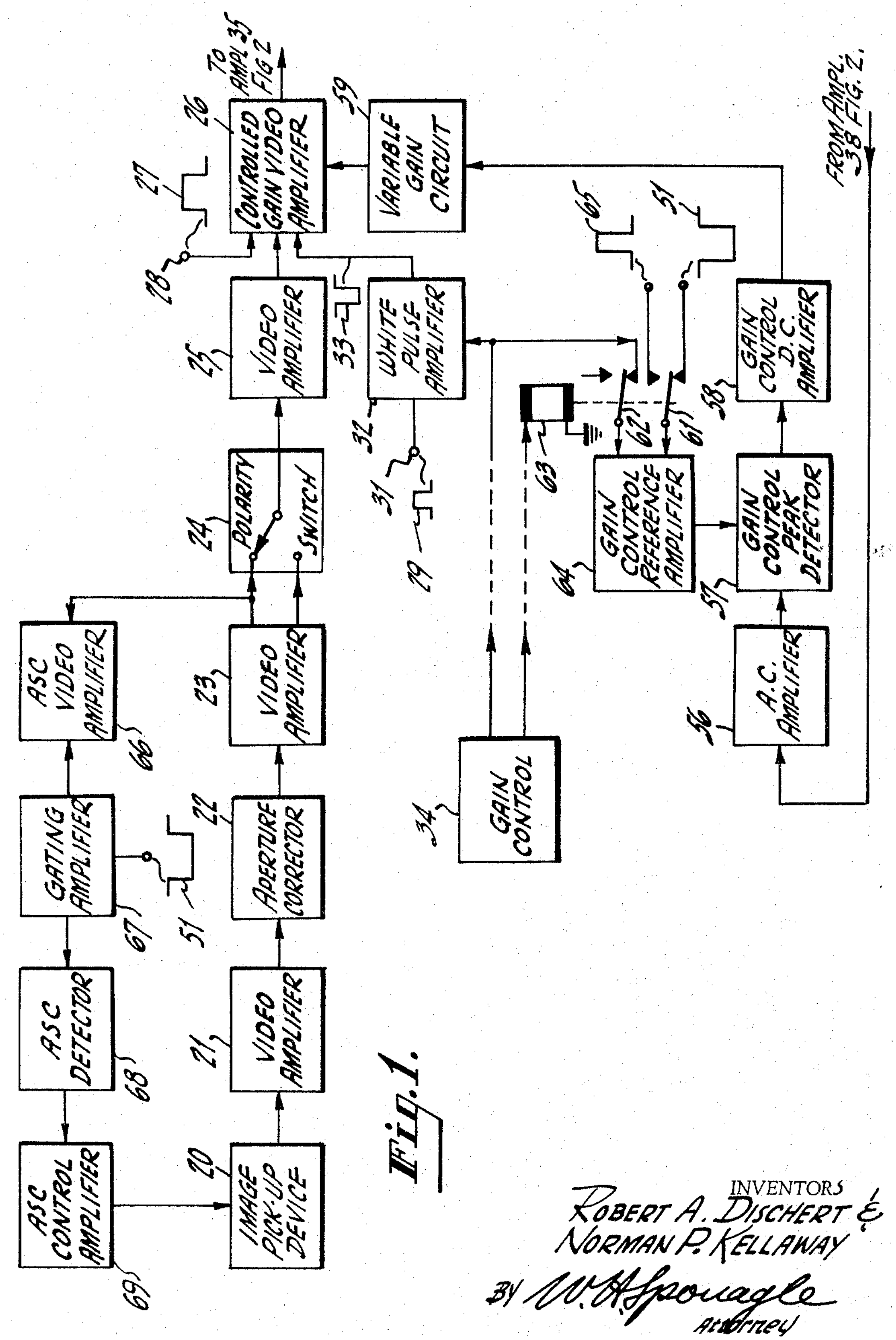
Figure 2:
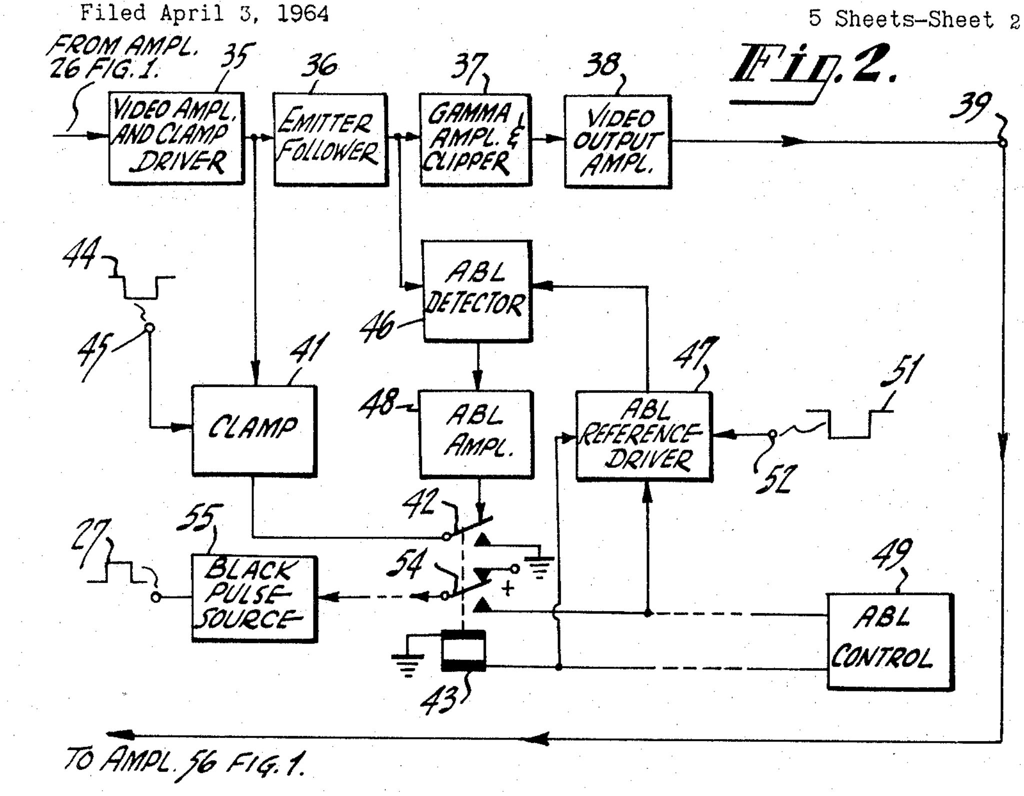

Referring now to FIGURES 1 and 2 of the drawings the chain of apparatus by which the video signal derived from the pickup device is processed for transmission will be described generally in terms of the various functions performed as represented by the blocks shown in these two figures. A video signal derived from the pickup device 20 is impressed upon the input of a video amplifier 21. This amplifier may consist of one or more stages, the output signal from which is impressed upon an aperture corrector 22. The aperture corrected signal is further amplified in a video signal amplifier 23 which produces in its output circuit video signals of opposite polarities. These two signals are impressed upon a polarity switch 24, the output of which has the polarity corresponding to the particular position of the switch and this signal is further amplified in a video amplifier 25.

The video signal derived from the amplifier 25 is impressed upon one input circuit of a controlled gain video amplifier 26. There also is impressed upon another input circuit of the amplifier 26 a train of black pulses 27 which are made available at a terminal 28 during horizontal blanking intervals. These pulses are shown as positive-going. It is to be understood that they may be negative going and of different amplitudes as explained subsequently. Alternatively, the black pulses 27 may be added to the video signal at some subsequent point so long as it is ahead of the clamping circuit to be described later. A train of white pulses 29, available at a terminal 31 during horizontal blanking intervals are amplified in a white pulse amplifier 32 to produce a train of amplified white pulses 33 for impression upon another input of the gain controlled amplifier 26. The amplitude of the white pulses 33 impressed upon the amplifier 26 is subject to variation by means of a circuit subsequently disclosed in detail included in gain control apparatus 34 and by which the gain of the amplifier 32 is controlled. The purpose of such amplitude variation also will be explained subsequently. The black pulses 27 and the white pulses 33 are added to the video signal in the amplifier 26 during horizontal blanking intervals to produce a composite video signal in the output circuit of this amplifier which includes a video signal portion having white and black signal peaks during the trace period of each horizontal scanning interval and having white and black pulses during the retrace period of each horizontal scanning interval. The gain controlled amplifier 26 also is subject to control of its degree of amplification in a manner to be subsequently described.

The composite video signal derived from the controlled gain amplifier 26 is impressed upon another video amplifier and clamp driver 35 from which it is successively transferred through an emitter follower stage 36, a gamma amplifier and clipper stage 37, and an output amplifier 38 for impression upon an output terminal 39 from which it is applied to suitable utilization apparatus for eventual transmission. The signal appearing at the input of the emitter follower stage 36 is applied to a clamp 41 which is connected to a point of reference determined by the position of a contact 42 of a relay 43. In the automatic position of the relay contact 42 shown, the reference potential is determined by the automatic black level setting apparatus which will be described presently. In the manual position of the contact 42, in response to the operation of the relay 43, the clamp 41 is returned to a fixed reference point such as ground. The clamp 41 operates in response to a clamp pulse 44 available at a terminal 45 during the horizontal blanking interval.

The automatic black level setting apparatus includes a black level detector 46 which receives at one input terminal the composite signal derived from the output of the emitter follower stage 36. This detector functions only during scanning intervals and when black level setting is being effected automatically to produce in its output circuit a unidirectional signal representing any difference in amplitude between video signals representing black areas of the picture and a reference voltage applied to another of its input circuits from an automatic black level reference driver 47. The output signal derived from the detector 46 is applied to an amplifier 48 which produces at its output terminal a unidirectional reference voltage which is applied to the clamp 41 by the contact 42 of relay 43 in its automatic position.

The amplitude of the reference voltage derived from the driver 47 for impression upon the black level detector 46 is determined by means of a circuit (subsequently disclosed in detail) included in automatic black level control apparatus 49. During automatic black level setting the reference driver 47 is rendered inoperative during horizontal retrace intervals by means of a gating pulse 51 available at terminal 52. By such means the automatic black level detector 46 and the amplifier 48 also are rendered periodically inoperative during horizontal retrace intervals.

When it is desired to set the black level of the video signal manually, the automatic black level setting apparatus is rendered continuously inoperative by effectively biasing the automatic black level reference driver 47 to a condition such as to prevent the automatic black level detector 46 from producing a signal in its output circuit. This operation is performed in a manner to be described from the automatic black level control apparatus and, at the same time, the relay 43 is energized to switch its contact 42 from the automatic to the manual position in which it is connected directly to the fixed reference ground potential. The relay 43 also has another contact 54 which is connected to a black pulse source 55 and which, in its automatic position shown, impresses a fixed positive voltage upon the black pulse source to produce the positive black pulse 27 of fixed amplitude and, in its manual position, connects the black pulse source to the automatic black level control apparatus 49 to produce a black pulse of a polarity and amplitude selected in a manner and for a purpose to be described subsequently.

The video signal appearing at the output terminal 39, after the described processing whereby it is gamma corrected and clamped to a desired black level potential, is applied to an AC amplifier 56 of FIGURE 1, the output of which is coupled to the input of a gain control peak detector 57. This detector responds to either the peak white video signals occurring during the scanning interval or to the white pulse 33 occurring during the retrace interval depending upon whether automatic or manual operation is in effect to produce in its output circuit a unidirectional voltage which is amplified in a gain control DC amplifier 58 and applied to a variable gain circuit 59 associated with the controlled gain amplifier 26.

If it is desired to effect automatic gain control of the video signal, contacts 61 and 62 of a relay 63 are in the positions shown in the drawing. Contact 61 applies the gating pulse 51 to one input circuit of a gain control reference amplifier 64 and contact 62 of this relay is effective to establish a reference level relative to which the peak detector 57 operates. The detector is operative during the horizontal scanning intervals to detect the peak white video signals and is rendered inoperative during horizontal retrace intervals by the gating pulses 51. The reference level for the detector is determined by controlling the biasing of the reference amplifier 64, partly from within the amplifier and partly from the gain control apparatus 34 as will be disclosed in detail subsequently.

When manual gain control is desired by means of the white pulses 33 in the composite signal, the relay 63 is energized from the gain control apparatus 34 in a manner to be described subsequently. Horizontal drive pulses 65 then are applied by relay contact 61 to the gain control reference amplifier 64 which effectively renders the peak detector 57 inoperative during horizontal trace periods and operative only during horizontal retrace periods. With the relay 63 operated the contact 62 is disconnected from the biasing control effected by the gain control apparatus 34 so that a fixed bias only is applied to the reference amplifier 64 from within the amplifier itself. The detector 57 then responds only to the white pulses 33, the amplitude of which is controlled from the gain control apparatus 34 as previously described.

The apparatus described up to this point is effective to perform such operations on the video signal as making aperture correction, gamma compensation, black level setting and gain control. By means of the latter two operations the black level is fixed and a desired gain control is effected, either one or both of which operations may be achieved by automatic or manual means.

The performance of such functions does not, however, effect any compensation for variations of the amplitude of the video signals derived from the pickup device 20 of FIGURE 1, such as those which may be caused, for example, by variations in the average light admitted to the pickup device from the subject. For this purpose there is provided an automatic sensitivity control video amplifier 66 which derives a signal from the output of the video amplifier 23. This signal is passed through a gating amplifier 67 so as to eliminate from the signal any effects which may be present in the signal during blanking intervals. Although the signal derived from the video amplifier 23 has not at that point been processed to include special signals during the horizontal blanking intervals such as the white and black pulses 33 and 27, the blanking of the pickup device during the horizontal retrace intervals may produce unwanted spurious transient effects which should be removed from the signal before it is detected for automatic sensitivity control purposes. Hence, the gating amplifier 67 is rendered operative during all but the first and last parts of the horizontal trace intervals by means such as the described gating pulses 51. By such means, any spurious signal effects caused by blanking of the pickup device and all other signals such as the black and white pulses 27 and 33 are removed from the video signal which is then impressed upon an automatic sensitivity control detector 68 to produce a unidirectional control voltage. This voltage, after suitable amplification by an amplifier 69, is impressed upon the image pickup device 20. The control voltage may be used to control a motor, for example, by which an iris diaphragm or variable neutral density filter may be changed to alter the amount of light entering the pickup device from the subject. Alternatively, the control voltage derived from the amplifier 69 may be applied to vary the target voltage of the pickup device so as to maintain substantial amplitude uniformity of the video signal derived from the pickup device and impressed upon the video signal amplifying and processing circuits such as those previously described.

Figures 6A, 6B, 7A, 7B, 7C, 8A, 8B, 8C:
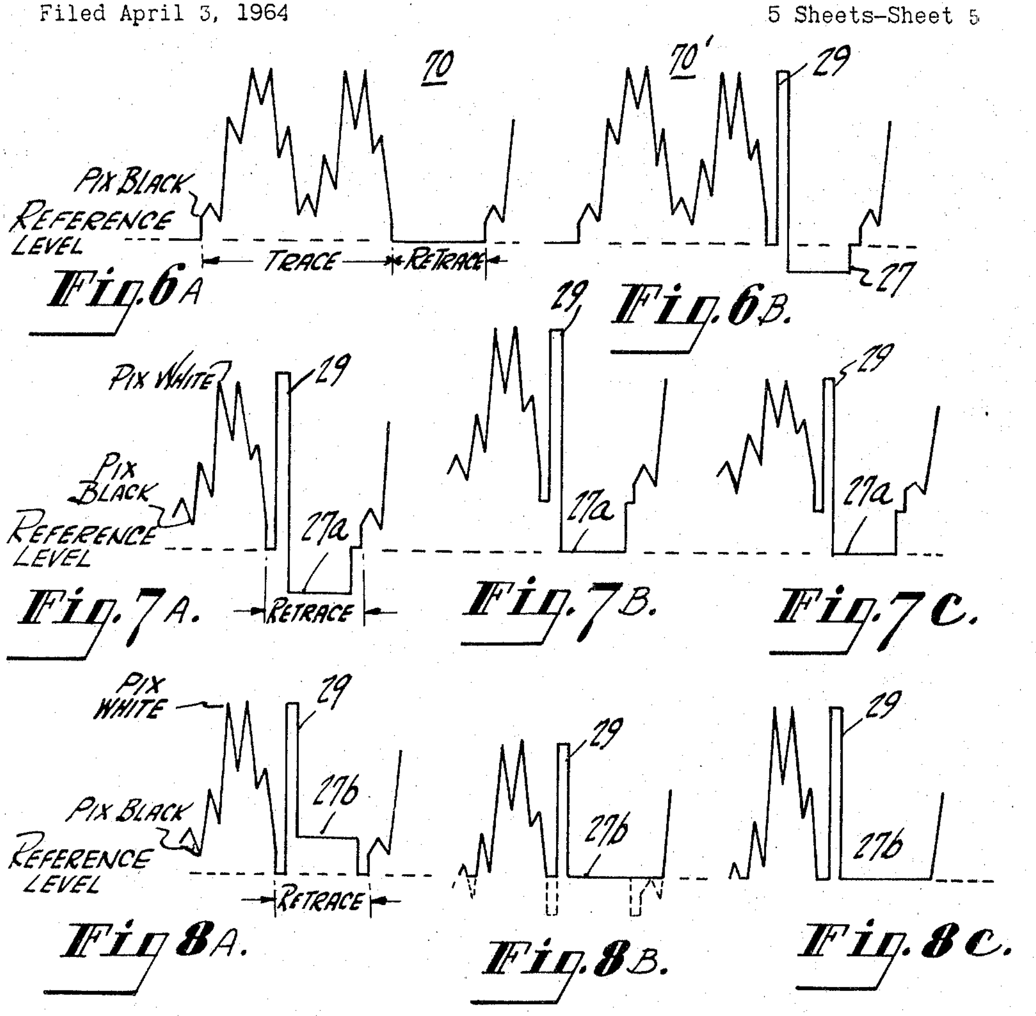
FIGURES 6A and 6B represent typical television signals which are processed by the apparatus embodying the present invention.
FIGURES 7A, 7B and 7C represent signal waveforms illustrating the operation of the black level and gain control apparatus embodying the invention when black level pulses of one polarity are employed.
FIGURES 8A, 8B and 8C represent signal waveforms illustrating the operation of the black level and gain control apparatus embodying the invention when black level pulses of the opposite polarity are employed.

Before considering in greater detail the operation of the gain control black level setting and automatic sensitivity control apparatus embodying the present invention reference now will be made briefly to FIGURES 6A and 6B for a description of the type of video signal which is processed by the disclosed apparatus. In FIGURE 6A there is shown a typical video signal as derived from the image pickup device 20 of FIGURE 1. During each horizontal trace or picture interval the signal 70 has different instantaneous amplitudes ranging from picture black to picture white. During each horizontal retrace or blanking interval the pickup device is blanked so that the signal 70 has essentially zero amplitude as represented at the blanking level. In FIGURE 6B there is shown a typical video signal 70' to which there has been added a white pulse 29 which extends from the blanking level in the direction toward the picture white level and also a black pulse 27. The black pulse is shown as extending from the blanking level to a so-called blacker-than-black level. It is to be understood that the amplitudes of each of the white and black pulses may be varied for desired purposes and that the polarity of the black pulse 27 may be opposite to that shown so that it extends from the blanking level in the direction of picture white. As previously indicated the apparatus embodying the present invention functions either automatically or manually to set the black level of the signal at a desired point and also to control the maximum or peak amplitude of the white video signals at a selected point above the blanking level.

Figure 9:
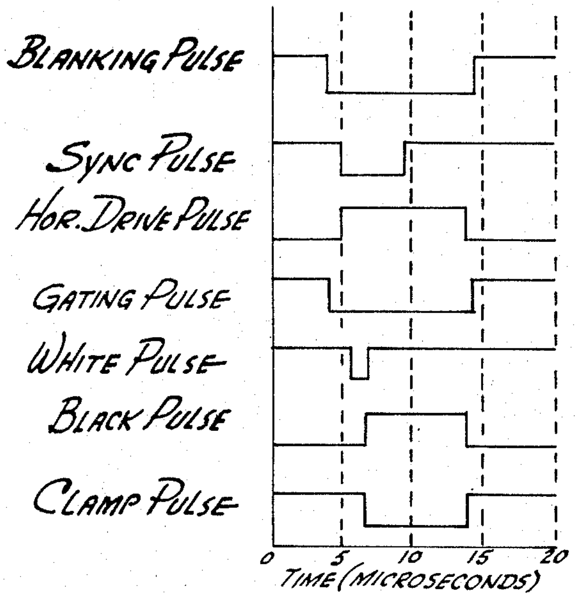
FIGURE 9 is a timing diagram of the various pulses used in the operation of the apparatus of FIGURES 1, 2, 3 and 4.

In order to better understand the detailed operation of the apparatus to be described an appreciation of the timing of the various pulses employed to control the apparatus is desirable. Both the timing and the polarity of the various pulses are shown in FIGURE 9. All of the pulses occur during the horizontal blanking interval which is determined by the blanking pulse which is shown together with the horizontal sync pulse principally for reference purposes. Also, it is to be noted that the horizontal drive pulse, the white and black pulse and the clamp pulse all occur during the negative going excursion of the gating pulse. Another thing to be noted is that the white pulse precedes the black pulse and that the clamp pulse occurs simultaneously with the black pulse. The black pulse is shown as being a positive polarity but it is to be understood that in accordance with one of the desired controls of the apparatus embodying the invention the black pulse may be of opposite polarity. Also, it is to be understood that the white and black pulses may be of different amplitude as selected by the control apparatus.

Figure 3:
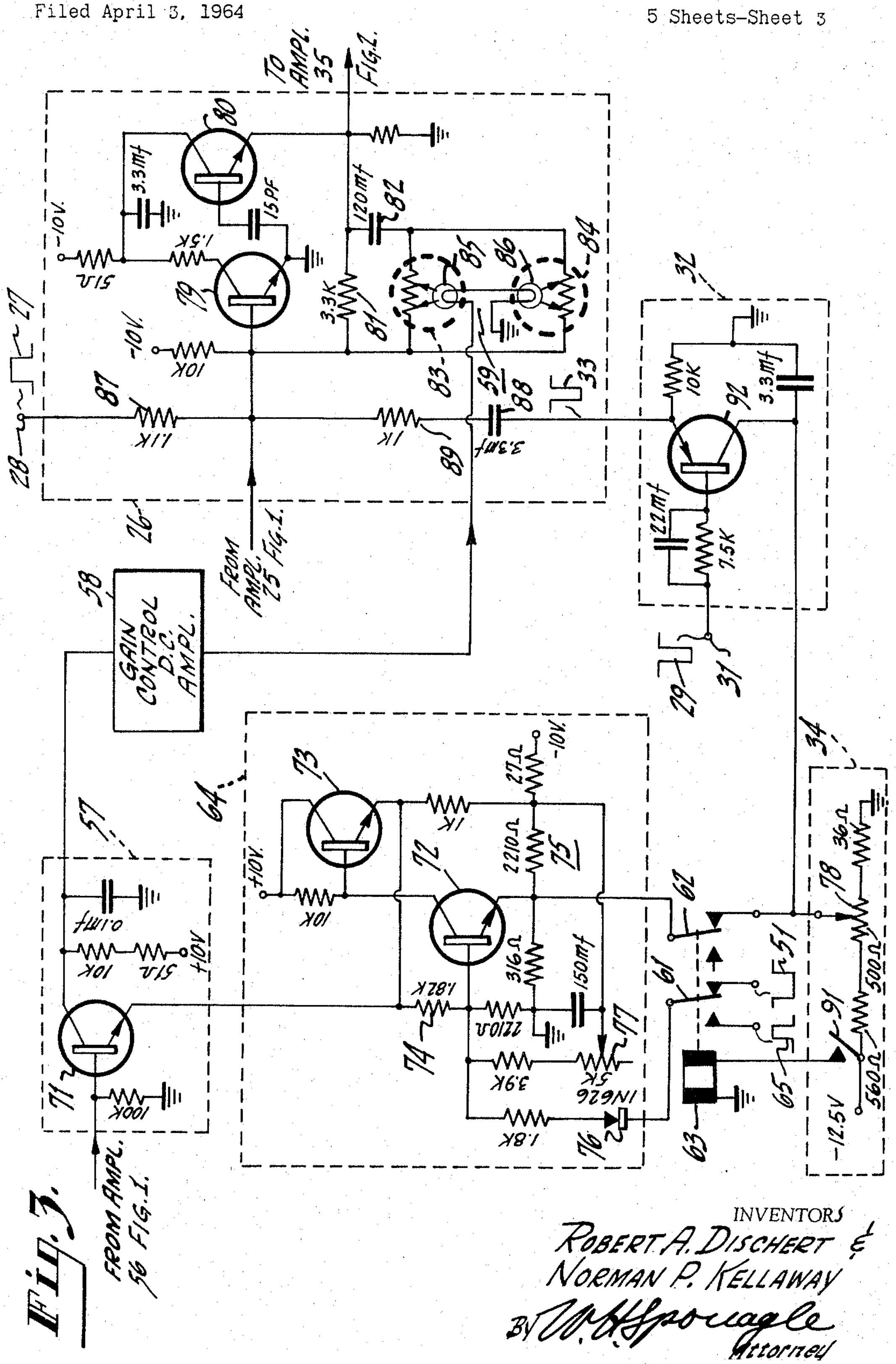
FIGURE 3 is a schematic circuit diagram of that portion of the apparatus shown in FIGURE 1 by which gain control of the television signal is effected.

Reference now is made to FIGURE 3 for a detailed operation of the apparatus by which gain control is achieved whereby to maintain the peak white video signals at a preselected amplitude relative to the blanking level of the video signal. As previously described gain control of the video signal is accomplished by detecting either the peak white video signals occurring during horizontal trace intervals or the white pulses occurring during horizontal retrace intervals. The detector 57 includes a transistor 71 which receives a signal at its base electrode derived from the AC amplifier 56 and such signal represents that appearing at the output terminal 39 of FIGURE 2 in which white signals are positive going and black signals are negative going. This signal effectively is compared with the reference voltage applied to the emitter electrode of the transistor 71 so as to produce at the collector electrode a DC voltage representing any difference between the peak video signal and the reference voltage.

The reference voltage derived from the gain control reference amplifier 64 is selected by suitably controlling the voltages applied to and derived from the transistors 72 and 73 which are connected as a feedback pair in which the collector electrode of the input transistor 72 drives the base electrode of the output transistor 73 and the emitter electrode of the output transistor is coupled by a feedback resistor 74 to the base electrode of the input transistor and also supplies the reference voltage to the peak detector transistor 71. The input transistor 72 serves to combine two signal effects: (1) the D.C. signal impressed upon its emitter electrode from the voltage divider 75; and (2) the pulse signal (either the gating pulse 51 or the horizontal drive pulse 65) impressed upon its base by the circuit including a diode 76. The voltage developed at the emitter electrode of the output transistor 73 therefore, is an additive combination of the D.C. and pulse signals applied to the input transistor 72.

For the purpose of this description assume that it is desired to effect gain control automatically in response to the peak white signals occurring during the horizontal trace intervals. The relay 63 is de-energized so that its contact 61 applies the gating pulse 51 in the polarity shown to the base circuit of the input transistor 72. In view of the timing relationship shown in FIGURE 9 the polarity of the gating pulse 51 is such that, during all of the horizontal trace interval, there is no current flow in the circuit through diode 76.

The input transistor 72 is biased under the joint control of apparatus including a variable resistor 77, located at the camera or pickup apparatus, and a potentiometer 78, located in the gain control apparatus 34 which generally is at a point remote from the camera or pickup apparatus. The biasing of the transistor 72 is such that it causes sufficient collector-to-emitter conduction in the transistor 73 to impress a voltage at the emitter of the detector transistor 71 which is substantially equal to the voltage desired for the maximum white peaks of the video signal.

If there is any increase in the positive going amplitude of the white signal peaks impressed upon the base of the detector transistor 71, this increase which is in excess of the reference voltage applied to the emitter of the detector transistor is effective to cause sufficient conduction in the collector-to-emitter circuit of the transistor to produce an increase in the D.C. output signal. This D.C. signal is applied to the gain control D.C. amplifier 58 and thence to the variable gain circuit 59 of the controlled gain video amplifier 26 to decrease the gain of the amplifier in a manner to be particularly described presently. Thus, the peak white amplitude of the video signal is decreased so that it is restored to the amplitude selected by the described control facilities including the potentiometer 78 of the gain control apparatus 34.

Any decrease in the amplitude of the white peak video signals from the selected amplitude renders the detector transistor 71 inoperative so that the D.C. voltage derived from the collector decreases by operation of the time constant circuit associated with the collector electrode. The decreased D.C. voltage, after amplification by the gain control amplifier 58, is effective through the agency of the variable gain circuit 59 to increase the gain the amplifier 26 until the peak white signals again are restored to the desired amplitude.

During horizontal retrace intervals the negative going gating pulse 51 is effective to cause conduction through the diode 76 of the reference amplifier 64, thereby to bias the input transistor 72 to a substantially nonconducting state. This condition results in an increase in conduction in the collector-to-emitter circuit of the output transistor 73 such that a sufficiently high positive voltage is impressed upon the emitter electrode of the detector transistor 71 to render it completely inoperative. In this manner the detector 57 is rendered completely unresponsive to signal effects such as the white pulses occurring during horizontal retrace intervals.

The controlled gain video amplifier 26 includes a feedback pair of transistors 79 and 80. The video signal derived from the video amplifier 25 of FIGURE 1 is impressed upon the base electrode of the input transistor 79 in such polarity that black signals are negative going and white signals are positive going. Signal output from the input transistor 79 is derived from the collector electrode and impressed upon the base electrode of the output transistor 80 which is connected as an emitter follower so that the video signal which is applied to the video amplifiers and clamp driver 35 of FIGURE 2 has such polarity that white is positive going and black is negative going.

A D.C. degenerative feedback path from the emitter electrode of output transistor 80 to the base electrode of the input transistor 79 is provided by a circuit including a resistor 81. This resistor provides a fixed amount of feedback so as to maintain the operating point of the transistors 79 and 80 substantially constant. An A.C. degenerative feedback path from transistor 80 to transistor 79 is provided by a circuit including a capacitor 82 in series with the parallel arrangement of two variable resistors 83 and 84. These resistors are of a photo-resistive type and include light sources 85 and 86 respectively. The light sources are connected in series and to the output of the gain control D.C. amplifier 58 from which they receive the D.C. control voltage produced in the manner previously described with reference to the operation of the peak detector 57. A variation of the D.C. energizing voltage for the light sources 85 and 86 produces variations in the magnitude the resistors 83 and 84, thereby varying the A.C. feedback between the transistors 80 and

79 to produce a suitable variation in the gain of the amplifier 26.

The black pulse 27 available at the terminal 28 is applied to the base electrode of the input transistor 79 of the controlled gain video amplifier 26 by a circuit including a resistor 87. Also, the white pulse 33, after appropriate amplitude control by the white pulse amplifier 32, is impressed upon the base electrode of transistor 79 by a circuit including a series arrangement of a coupling capacitor 88 and a resistor 89. By such means the black and white pulses 27 and 33 are added during horizontal retrace intervals to the video signal derived from the amplifier 25 of FIGURE 1 so as to produce at the output of the amplifier 26 a composite video signal for impression upon the video amplifier and clamp driver 35 of FIGURE 2.

When it is desired to manually control the gain of the video signal, a switch 91 at the gain control apparatus 34 is closed to operate the relay 63. The switch contact 62 disconnects the gain controlling potentiometer 78 at the control apparatus 34 from the gain control reference amplifier 64. The biasing of this amplifier under such conditions then is controlled only by the biasing circuits including the variable resistor 77 located at the camera or image pickup apparatus. The contact 61 of the relay 63 impresses a positive going horizontal drive pulse 65 upon the circuit including the diode 76 of the amplifier 64. By means of such a pulse the amplifier is operated so as to render the peak detector transistor 71 inoperative during horizontal trace intervals and to render this transistor capable of operation only during the horizontal retrace intervals. Thus, the peak detector 57 responds only to the white pulses which occur during the horizontal retrace intervals.

The white pulse 29 available at the terminal 31 is applied to the base electrode of a transistor 92 included in the white pulse amplifier 32. The voltage applied to the collector electrode of this transistor is derived from the potentiometer 78 at the gain control apparatus 34. The adjustment of this potentiometer thus controls the amplification of the white pulses so that, after they have been added to the video signal during the horizontal retrace intervals in the manner described, the gain control of the controlled gain amplifier 26 is effected by the described detection of the white pulses by the peak detector 57.

Figure 4:
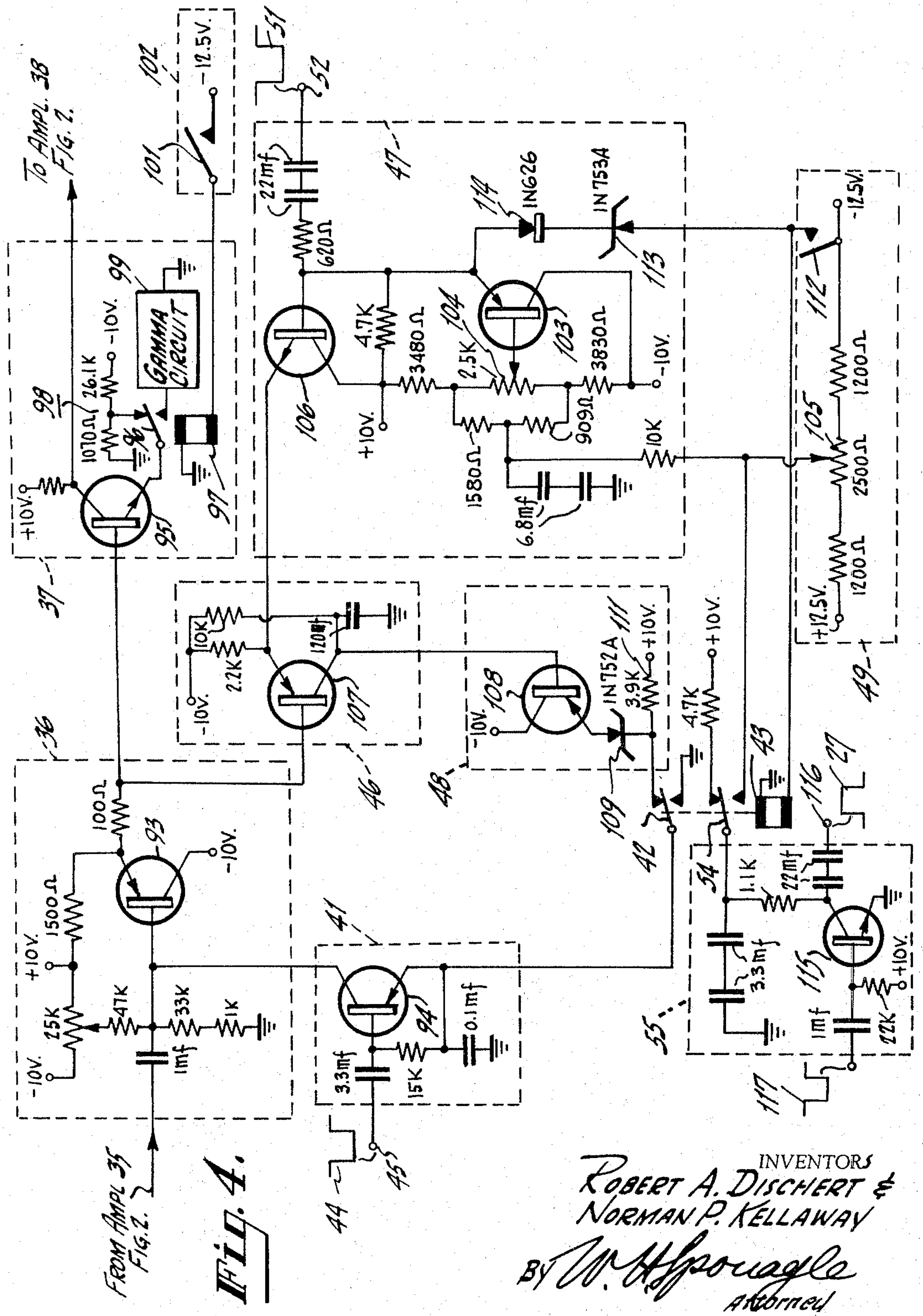
FIGURE 4 is a schematic circuit diagram of that portion of the apparatus shown in FIGURE 2 by which black level of the television signal is effected.

Reference now is made to FIGURE 4 of the drawings for a description of the apparatus by which black level of the video signal is established. First, consider the operation of this apparatus when black level is to be set automatically. The composite video signal derived from the video amplifier and clamp driver 35 is applied to the base electrode of a transistor 93 of the emitter follower stage 36 in such polarity that black signals are negative going and white signals are positive going. For automatic black level setting the relay 43 is de-energized so that the contacts 42 and 54 thereof are in the positions shown. The video signal, applied simultaneously to the base of the emitter follower transistor 93 and to the collector electrode of the clamp transistor 94, has had a black pulse 27 added during its retrace interval that coincides in time with the clamp pulse 44. The clamp transistor 94, driven to saturation by the clamp pulse 44 applied to its base electrode, has its emitter electrode connected to the relay contact 42 to which a suitable reference potental for clamping is applied as subsequently described.

The video signal, thus clamped, is direct coupled via the emitter follower stage transistor 93 to the base electrode of a gamma amplifier and clipper transistor 95 with positive going white signals and negative going black signals. The emitter electrode of the transistor 95 is connected by a contact 96 of a gamma relay 97 either to a voltage divider network 98 as shown or to a gamma correction circuit 99. In either case the emitter is connected effectively substantially to a ground reference potential. When it is desired to effect gamma correction of the signal a switch 101 of a gamma control apparatus 102, which may be located remotely from the signal processing apparatus, is closed to energize the relay 97 thereby to connect the emitter electrode of transistor 95 to the gamma correction circuit 99 by means of the contact 96. Thus, the video signal reproduced at the collector electrode of the transistor 95 and applied to the video output amplifier 38 of FIGURE 2 is clamped to the desired black level and clipped essentially at ground potential.

The manner in which the reference voltage for application to the emitter electrode of the clamp transistor 94, when automatic black level setting is desired, now will be described. In general, the selection of this voltage is determined by the operation of the automatic black level reference driver 47 which controls the automatic black level detector 46 which in turn applies the desired voltage to the relay contact 42 after suitable amplification by the automatic black level amplifier 48.

The biasing of transistor 103 of the automatic black level reference driver 47 by a potentiometer 104 located at the camera or pickup apparatus and a black level control potentiometer 105 located in the automatic black level control apparatus 49 effectively determines the reference voltage for the detector 46 and thus the clamping voltage for the clamp 41. By means including these two controls the transistor 103 is rendered conducting during the gating pulse interval so as to control another transistor 106 suitably to apply a reference voltage to the emitter electrode of a transistor 107 of the automatic black level detector 46. The reference driver 47 is rendered operative by the gating pulses 51 which are applied to the base electrode of the reference driver transistor 106.

Any difference between the reference voltage applied to the emitter electrode of the detector transistor 107 and the black level of the video signal applied to the base of this transistor is detected to develop a voltage representative of this difference in the collector electrode circuit of the detector transistor. This voltage is amplified by impression upon the base electrode of a transistor 108 in the automatic black level amplifier 48 so as to establish a voltage at the emitter electrode of this transistor which is applied through a zener diode 109 to the relay contact 42 and, in conjunction with the positive voltage applied to the relay contact through a resistor 111, is effective to produce the desired reference voltage for the clamp transistor 94.

For manual black level setting a switch 112 at the black level control apparatus 49 is closed to apply a negative voltage to the automatic black level reference driver 47 through a zener diode 113 used as a voltage dropping resistance and a diode 114 to the emitter electrode of transistor 103 so as to bias this transistor to a nonconducting state and thereby render inoperative the automatic black level setting apparatus including the reference driver 47, the detector 46 and the amplifier 48.

The closure of the switch 112 also energizes the relay 43 to switch the contact 42 to ground so that the clamp 41 operates with reference to ground potential. Also, the energization of the relay 43 places the contact 54 in circuit with the black level control potentiometer 105 of the black level control apparatus 49. This places a transistor 115 of the black pulse source 55 under the control of the black level setting potentiometer 105 so that the black pulses 27 produced at the output terminal 116 of the pulse source may have either polarity and different amplitudes as determined by the adjustment of the potentiometer 105. Timing of the black pulses 27 in accordance with FIGURE 9 is effected under the control of pulses 117 applied to the base of the transistor 115. As previously described the black pulses 27 are added to the video signal during horizontal blanking intervals, either at one of the inputs of the control gain video amplifier 26 of FIGURES 1 and 3 or at some other point such as, for example, in the video amplifier 35 of FIGURE 2.

Assume that it is desired to set the black level of the video signal higher than the reference level such as ground, in other words, in a direction toward white video signals. The potentiometer 105 of the black level control apparatus 49 is adjusted so as to produce a negative going black pulse 27 for inclusion with the video signal. As indicated in FIGURE 7A, the black pulse **27*a* extends in a negative direction from the reference level. When the signal such as that shown in FIGURE 7A is clamped to ground by the clamp 41 at least momentarily it will appear as in FIGURE 7B in which the black pulse 27*a*** is clamped to the reference level and the remainder of the video signal is moved upward in the direction of picture white so that the picture black portions of the signal are more positive than the reference level. Also, the picture white signals are to the same extent more positive relative to the reference level than as shown in FIGURE 7A.

Assume that for the moment the signal of FIGURE 7B is that produced at the output terminal 39 of FIGURE 2 and fed back to the gain control apparatus of FIGURE 1 including the amplifier 56 and the peak detector 57. In a manner similar to that described with reference to FIGURE 3 the peak detector 57 operates to produce a DC control signal which is applied to the variable gain circuit 59 of the control gain video amplifier 26 to so reduce the gain of this amplifier that the picture white signals are reduced to their original level relative to the reference potential as shown in FIGURE 7C. It is to be noted with reference to the waveform of this figure that the negative going black pulse **27*a*** remains clamped to the reference level and the picture black representative and all other video signals are reduced in amplitude relative to the reference level in the same proportions as the white representative signals. Thus, the black level of the video signal is raised in the direction of picture white without resulting in any change in the picture white representative signals relative to the reference level.

Assume now that it is desired to lower the black level of the video signal. A suitable adjustment of the black level control potentiometer 105 of the black level control apparatus 49 is made to so control the operation of the transistor 115 of the black pulse source 55 to produce a positive going black pulse **27*b* which is added to the video signal during horizontal retrace intervals to form a signal such as shown in FIGURE 8A. In this case the amplitude of the black pulse 27*b* is such that it is more positive relative to the reference potential level than some of the picture black video signals. When a signal such as shown in FIGURE 8A is clamped to ground by the clamp 41 a signal such as shown in FIGURE 8B is produced in which it will be noted that the black pulse is now at the reference level and the video signal including both white and black pulses have been decreased toward or below ground potential. When such a signal is processed by the gamma amplifier and clipper circuits 37**, all of those portions of the composite signal which are more negative than the reference level are clipped.

The clipped portions of the signal are indicated by broken lines in FIGURE 8B and it is to be noted that some of the black video signals have been clipped and therefore are no longer present in the signal as it momentarily appears at the output terminal 39. The feedback of such a signal to the gain control apparatus of FIGURES 1 and 3 results in such operation of that apparatus that the gain of the control gain video amplifier 26 is increased sufficiently to reset the white picture portions to the same amplitude relative to the reference level as these picture representative signals originally had. In FIGURE 8C there is shown the resulting video signal after operation of the black level and gain controls. Certain black portions of the video signal are missing by reason of the described clipping action and the white picture signals have the same amplitude relative to the reference level as in the original signal shown in FIGURE 8A.

It is to be understood that the described operations are effectively produced substantially simultaneously and that the various forms of signals shown in FIGURES 7 and 8 practically do not exist, at least for no more than an instant, and are used in this description principally for purposes of explanation. Also, it is to be understood that the described manual black level setting may be achieved when manual gain control is being effected. As previously described, in such a case, the gain control apparatus will respond to the white pulses 29 instead of to the picture white video signals. In such an operation it also is to be understood that the white pulses 29 as introduced into the composite signal may have amplitudes differing from the picture white signals derived from the camera or pickup apparatus. The showing in FIGURES 6, 7 and 8 of the white pulses 29 as being of the same amplitude as the picture white signals only is rigorously correct as the signals appear at the output terminal 39.

Figure 5:
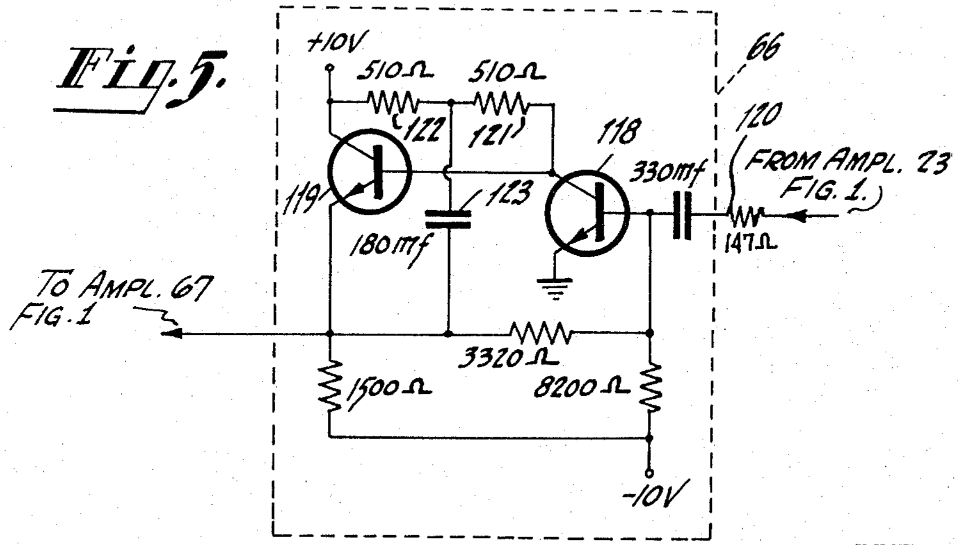
FIGURE 5 is a schematic circuit diagram of one of the video signal amplifiers of FIGURE 1.

The apparatus embodying the invention includes as the automatic sensitivity control video amplifier 66 of FIGURE 1 another arrangement of a feedback pair of transistors which is shown particularly in FIGURE 5 to which reference now is made. The feedback pair of transistors 118 and 119 is arranged in a circuit in which the video signal derived from the amplifier 23 of FIGURE 1 is impressed upon the base electrode of the input transistor 118 by means including a series resistor 120. The collector electrode of this transistor is connected to a voltage supply through a series arrangement of load resistors 121 and 122. The collector electrode of the input transistor also applies the amplified signal to the base electrode of the output transistor 119. The output signal is derived from the emitter electrode of transistor 119 and is applied to the gating amplifier 67 of FIGURE 1. A boot strap type of feedback circuit is provided by a capacitor 123 connected between the emitter electrode of the output transistor 119 and the junction point between the two load resistors 121 and 122 of the input transistor 118.

As the video signal applied to the input transistor 118 produces a voltage change at the collector electrode of this transistor by reason of the voltage drop through the load resistors 121 and 122, that same voltage change in the same direction is produced at the junction point between the resistors 121 and 122 by the impression thereon of the video signal derived from the output transistor 119 at a much lower impedance. This voltage change is in the same direction and substantially in the same magnitude as that occurring at the collector electrode of the input transistor 118. With substantially no voltage changes occurring across resistors 121 and 122 with variations of signal magnitude, all current conduction changes in transistor 118 caused by signal variations are gainfully employed in the amplifier and do not result in varying losses in the load resistors 121 and 122. One important beneficial result of such an arrangement to enable the design of an amplifier circuit with a high degree of performance dependability and, therefore, to obviate the need for gain controls to compensate for non-uniformity of components such as the transistors. The amplifier, thus, can operate with relatively high level signals using only a relatively low voltage power supply.

The circuit details shown in FIGURES 3, 4 and 5 include values of the various circuit components which had been used in one successfully operated embodiment of the invention. The following table indicates the types of transistors used in these circuits.

| Reference No.: | Transistor type |
|---|---|
| 71 | 2N706A |
| 72 | 2N706A |
| 73 | 2N2222 |
| 79 | 2N706A |
| 80 | 2N706A |
| 92 | 2N1301 |
| 93 | 2N404 |
| 94 | 2N404 |
| 95 | 2N706A |
| 103 | 2N404 |
| 104 | 2N706A |
| 107 | 2N404A |
| 108 | 2N706A |
| 115 | 2N1302 |
| 118 | 2N706A |
| 119 | 2N706A |

What is claimed is:

1. In a video signal amplifying and processing system, the combination comprising:

a controlled gain amplifier having an input circuit receiving a video signal, a gain controlling circuit receiving a gain controlling voltage, and an output circuit for producing an amplified video signal of a selected maximum white representative amplitude relative to a reference potential;

means coupled to said amplifier output circuit to clamp said amplified video signal to a selected reference potential;

automatic black level setting apparatus coupled to receive said clamped video signal and operative to detect the black representative portions of said signal relative to a selected reference voltage and to produce said reference potential for said clamping means; and a feedback loop having an input circuit coupled to receive said clamped video signal and an output circuit coupled to the gain controlling circuit of said gain controlled amplifier, said feedback loop including a detector for detecting white representative signal peaks relative to a selected reference voltage to produce a gain controlling voltage for said gain controlled amplifier suitable to maintain said selected maximum white representative video signal amplitude independently of said black level video signal setting.

2. In a video signal amplifying and processing system, the combination comprising:

a controlled gain amplifier having an input circuit coupled to receive a video signal, a gain controlling circuit coupled to receive a gain controlling voltage, and an output circuit for producing an amplified video signal of a selected maximum white representative amplitude relative to a reference potential;

means coupled to said amplifier output circuit to clamp said amplified video signal to a selected reference potential;

a gamma amplifier having an input circuit coupled to receive said clamped video signal and operative to produce in its output circuit a selected non-linearly amplified version of said signal for delivery to utilization apparatus;

automatic black level setting apparatus coupled to receive said clamped video signal and operative to detect the black representative portions of said signal relative to a selected reference voltage and to produce said reference potential for said clamping means; and a feedback loop coupled from the output circuit of said gamma amplifier to the gain controlling circuit of said gain controlled amplifier and including a detector for detecting white representative signal peaks relative to a selected reference voltage to produce a gain controlling voltage for said gain controlled amplifier suitable to maintain said selected maximum white representative video signal amplitude independently of said black level video signal setting.

3. In a video signal amplifying and processing system, the combination comprising:

means for producing a video signal having trace and retrace intervals, a first white indicating signal comprising picture white representative signals of a given polarity relative to a reference potential occurring during each of said trace intervals, a second white indicating signal comprising a white pulse of said given polarity and a selected amplitude occurring during each of said retrace intervals, and a black pulse of a selected amplitude and a selected polarity relative to said reference potential occurring during each of said retrace intervals;

a controlled gain amplifier coupled to receive said video signal and to produce an amplified video signal for delivery to utilization apparatus;

clamping means coupled to receive said amplified video signal from said amplifier and responsive to said black pulses to set the picture black representative portions of said amplified video signal at a level which is determined by the selected amplitude and polarity of said black pulses; and gain controlling means coupled to receive said amplified video signal from said amplifier and responsive to one of said white indicating signals to control the gain of said amplifier so as to maintain said white representative signals of said amplified video signal at the level relative to said reference potential which is determined by the amplitude of said one white indicating signal relative to said reference potential irrespective of said black representative signal level relative to said reference potential.

4. In apparatus as defined in claim 3:

means functioning to time the operation of said gain controlling means for response to said first white indicating signal comprising said picture white representative signals.

5. In apparatus as defined in claim 3:

means functioning to time the operation of said gain controlling means for response to said second white indicating signal comprising said white pulses.

6. In a video signal amplifying and processing system, the combination comprising:

means for producing a video signal having trace intervals in each of which occur picture representative signals having a given polarity relative to a reference potential with the white representative signals having greater amplitudes than the black representative signals relative to said reference potential, and retrace intervals in each of which occur a white pulse of said given polarity and a selected amplitude and a black pulse of a selected amplitude and a selected polarity relative to said reference potential;

a controlled gain amplifier coupled to receive said video signal and to produce an amplified video signal for delivery to utilization apparatus;

clamping means coupled to receive said amplified video signal from said amplifier and responsive to said black pulses to set the black representative signals at a level which is determined by the selected amplitude and polarity of said black pulses;

clipping means coupled to receive said amplified and clamped video signal from said clamping means and functioning to eliminate from said video signal all portions thereof having a polarity relative to said reference potential opposite to said given polarity; and gain controlling means coupled to receive said amplified, clamped and clipped video signal and responsive to said white pulses to control the gain of said amplifier so as to maintain said white representative signals of said amplified video signal at the level relative to said reference potential which is determined by the amplitude of said white pulses relative to said reference potential irrespective of said black representative signal level setting relative to said reference potential.

7. In a video signal amplifying and processing system, the combination comprising:

means for producing a video signal having picture white representative portions of a given polarity relative to a reference potential during each trace interval, a white pulse of said given polarity and a selected amplitude, and a black pulse of a selected amplitude and a selected polarity relative to said reference potential, both of said pulses occurring during each retrace interval;

a controlled gain amplifier coupled to receive said video signal and to produce an amplified video signal for delivery to utilization apparatus;

clamping means coupled to receive said amplified video signal from said amplifier and responsive to said black pulses to set the picture black representative portions of said amplified video signal at a level relative to said reference potential which is determined by the selected amplitude and polarity of said black pulses; and means responsive to said white pulses of said amplified video signal to control the gain of said amplifier so as to maintain said white representative portions of said amplified video signal at the level relative to said reference potential which is determined by said selected white pulse amplitude relative to said reference potential irrespective of said black representative signal setting relative to said reference potential.

8. In a video signal processing system, the combination comprising:

means for producing a video signal having picture white representative portions of a given polarity relative to a reference potential during each trace interval and a pulse of a selected amplitude and a selected polarity relative to said reference potential during each retrace interval; and clamping means responsive to the pulses of said composite signal to set the black representative portions of said video signal at a level relative to said reference which is determined by said selected pulse amplitude and polarity.

9. In a video signal processing system, the combination comprising:

a source of a video signal having picture white representative portions of a given polarity relative to a reference potential during trace intervals;

a source of pulses;

means for controlling the amplitude and polarity of said pulses to produce pulses of a selected amplitude and polarity;

means for adding said pulses of selected amplitude and polarity to said video signal during retrace intervals to produce a composite signal; and clamping means responsive to the pulses of said composite signal to set the black representative portions of said video signal at a level relative to said reference potential which is determined by said selected pulse amplitude and polarity.

10. In a video signal amplifying system, the combination comprising:

means for producing a video signal having maximum picture white representative excursions of a given polarity relative to a reference potential during each trace interval and a pulse of said given polarity and a selected amplitude relative to said reference potential during each retrace interval;

a controlled gain amplifier having an input circuit coupled to receive said video signal, a gain controlling circuit, and an output circuit for producing an amplified video signal of a selected maximum white representative amplitude relative to said reference potential for delivery to utilization apparatus;

means coupled to the output circuit of said amplifier and responsive to said retrace interval pulses to produce a gain controlling voltage representative of said selected pulse amplitude; and means for impressing said gain controlling voltage upon the gain controlling circuit of said amplifier to maintain said maximum picture white representative excursions of said video signal at a level relative to said reference potential which is determined by said selected pulse amplitude relative to said reference potential.

11. In a video signal amplifying system, the combination comprising:

a source of a video signal having maximum picture white representative excursions of a given polarity relative to a reference potential during trace intervals;

a source of pulses;

means for varying the amplitude of said pulses to produce pulses of a selected amplitude;

means for adding said pulses of selected amplitude to said video signal during retrace intervals in said given polarity to produce a composite signal;

a controlled gain amplifier having an input circuit, a gain controlling circuit, and an output circuit;

means for impressing said composite signal upon said input circuit;

means coupled to said output circuit and responsive to the pulses of said composite signal to produce a gain controlling voltage representative of said selected pulse amplitude; and means for impressing said gain controlling voltage upon said gain controlling circuit to maintain said maximum picture white representative excursions of said video signal at a level relative to said reference potential which is determined by said selected pulse amplitude relative to said reference potential.

12. In a signal processing system, the combination comprising:

first and second transistors each having base, emitter and collector electrodes;

means including a signal input circuit for impressing a signal upon the base electrode of said first transistor;

means connecting the collector electrode of said first transistor to a signal load and to the base electrode of said second transistor;

means connecting the emitter electrode of said second transistor to a signal load and to a signal output circuit; and means providing a direct current path between said signal input circuit for said first transistor and said signal load for said second transistor.

13. Apparatus as defined in claim 12 and also having:

means providing an alternating current path between said signal input circuit for said first transistor and said signal load for said second transistor.

14. Apparatus as defined in claim 12 and also having:

means impressing a second signal upon the emitter electrode of said first transistor to produce in said output circuit a combination of said second signal and the signal impressed upon the base electrode of said first transistor.

15. Apparatus as defined in claim 12 and also having:

means providing an alternating current path between said signal load for said first transistor and said signal load for said second transistor.

16. In a signal amplifying system, a variable gain amplifier comprising:

input and output transistors each having base, emitter and collector electrodes;

means impressing a signal upon the base electrode of said input transistor;

means connecting the collector electrode of said input transistor to a signal load and to the base electrode of said output transistor;

means connecting the emitter electrode of said output transistor to a signal load and to a signal output circuit for said amplifier; and a feedback signal circuit including a variable resistor connecting the emitter electrode of said output transistor and the base electrode of said input transistor and functioning to variably control the gain of said amplifier.

17. In a signal amplifying system, a variable gain amplifier comprising:

input and output transistors each having base, emitter and collector electrodes;

means impressing a signal upon the base electrode of said input transistor;

means connecting the collector electrode of said input transistor to a signal load and to the base electrode of said output transistor;

means connecting the emitter electrode of said output transistor to a signal load and to a signal output circuit for said amplifier;

a DC feedback circuit including a fixed resistor connecting the emitter electrode of said output transistor and the base electrode of said input transistor;

an AC feedback circuit including a series arrangement of a capacitor and a variable resistor connecting the emitter electrode of said output transistor and the base electrode of said input transistor; and means to vary said variable resistor and thereby vary the gain of said amplifier.

References Cited

UNITED STATES PATENTS

| | | | |
|---|---|---|---|
| 3,085,131 | 4/1963 | Diehl | 178—7.1 |
| 3,102,924 | 9/1963 | Legler | 178—7.2 |
| 3,180,934 | 4/1965 | Altman et al. | 178—7.2 |
| 3,198,882 | 8/1965 | Sennhenn | 178—7.1 |
| 3,206,547 | 9/1965 | Leitch et al. | 178—7.1 |
| 3,217,100 | 11/1965 | Voeckler | 178—7.1 |
| 3,281,530 | 10/1966 | Sennhenn | 178—7.1 |

JOHN W. CALDWELL, *Primary Examiner.*

R. L. RICHARDSON, *Assistant Examiner.*